United States Patent [19]
Weiner et al.

[11] 3,827,477
[45] Aug. 6, 1974

[54] METHOD OF HEATING ALCOHOLIC BEVERAGES

[75] Inventors: Robert I. Weiner, Owings Mills; Henri H. Hoge; Benicio I. Dussan V., both of Baltimore, all of Md.

[73] Assignee: Robert I. Weiner, Owings Mills, Md.

[22] Filed: Sept. 1, 1972

[21] Appl. No.: 285,591

[52] U.S. Cl............................ 165/1, 165/47, 62/457
[51] Int. Cl.............................................. F24h 3/00
[58] Field of Search............ 165/60, 47, 1; 62/457; 49/339

[56] References Cited
UNITED STATES PATENTS
3,373,579 3/1968 Federighi............................ 62/457

Primary Examiner—Charles Sukalo
Attorney, Agent, or Firm—Colton & Stone, Inc.

[57] ABSTRACT

A thick walled aluminum cocktail shaker is preheated to a predetermined temperature in excess of a desired hot service temperature for an alcoholic beverage, such as buttered rum mix. The shaker is removed from the preheat source prior to introduction of the beverage which is then shaken until thermal equilibrium is achieved.

The apparatus involves a preheat console upon which one or more of the cocktail shakers are, each, adapted to be supported in an inverted position in surrounding relation to an upstanding, substantially similarly shaped preheating element which, for a given power input, assures substantially uniform preheating of the entire shaker to a desired temperature within the shortest possible time.

5 Claims, 6 Drawing Figures

METHOD OF HEATING ALCOHOLIC BEVERAGES

BACKGROUND OF THE INVENTION

The recent introduction of premixed, hot buttered rum as a standard bar service drink imposes a hot bar service facility requirement in addition to the usual bar equipment. It is desirable, both from the standpoint of customer acceptance and bartending operations, that the hot service facility should permit of rapid, high volume service at least on the order of that conventionally associated with bartending operations. Furthermore, particularly as regards subjective bartending professionalism; the method of preparing and serving such hot drinks should involve conventional methods and/or procedures insofar as possible. The method disclosed herein is based upon the use of a preheated cocktail shaker virtually indistinguishable, in use, from a conventional cocktail shaker and which may be employed as such in the mixing of cold drinks simply by omitting the preheating step.

An all important factor which is unique to high volume, hot alcoholic beverage service and has thus not been a matter of previous concern is hot serving temperature. A proper serving temperature for hot buttered rum approximates that of coffee at about 145° F. Drinks served at temperatures substantially in excess of 145° F. not only require a cooling off period which is inconsistent with normal drinking patterns but, also, present a very real hazard to the unsuspecting consumer. Conversely, a tepid buttered rum drink is generally considered to be unpalatable.

Thus the problems faced by the addition of a hot bar service facility to the conventional bar line equipment include a fast, high volume service capability at substantially uniform serving temperatures and wherein the additional overhead does not dictate substantial retail price increase.

The various conventional approaches utilized in the service of hot, non-alcoholic drinks such as soups, coffee, tea, hot chocolate and the like have been found deficient or inferior on one or more of the aforestated criteria. Thus, for example, an attempt to maintain a sufficiently large volume of hot buttered rum to permit of fast, high volume service at a desired serving temperature in the absence of substantially continuous agitation is not practical. This, primarily, for the reason that the relatively low thermal conductivity of such liquids, when heated in large volumes without agitation, insures that the batch temperature will not be uniform throughout and this condition is aggravated by high volume service requiring batch replenishment. Secondarily, unless special homogenization procedures are used in the preparation of the buttered rum mix, butter precipitates from a quiescent heated batch. Continuous agitation of a large volume, heated batch is not economically practicable because of the requirement for a motor driven mechanism and the necessary use of relatively expensive stirrer elements, such as stainless steel, which produce no deleterious food effect upon long term immersion in the heated liquids.

Similarly, the use of a simple, individual drink, immersion heater requires fabrication from stainless steel or similar resistant material; but the primary objection to immersion heating of individual drinks is the expense and difficulty of insuring constant serving temperatures if, indeed, such desideratum could be achieved at all. The latter is more readily explainable as the converse of the invention herein disclosed; even if the immersion heater be thermostatically controlled, failure to remove the heater from the drink at precisely the right time will result in an excessive service temperature since the heater will be much hotter than the desired serving temperature for a substantial period after the same is deenergized and will continue to heat the beverage. A similar objection applies to any heating method where the temperature of the heated drink is to be rapidly elevated by a heat source where the heat source and drink do not attain thermal equilibrium at the desired serving temperature. Additionally, the high electrical power requirements for use of an immersion heater to bring a typical 5 oz. serving from ambient to 145° F. within a matter of 10–15 seconds represents a prohibitive overhead increase, per serving.

Flow-through heaters are similarly deficient as regards electrical power requirements with approximately 2.5 kw being required to heat a 5 oz. serving from 75° to 145° F. in 10 seconds. Flow-through heaters are also difficult to clean and long term reliability is adversely affected by high temperature cyclic operations.

Since it is desirable that the buttered rum mixes be glass contained for overall aesthetic compatibility with the remainder of the conventional bar stock, it will be appreciated that heating of the drinks within their original containers is time consuming and may not be practical because of the likelihood of bottle breakage for high energy short time heating requirements.

The primary object of the invention is to provide an economical method of heating individual liquid serving portions to appropriate, hot serving temperatures within a time period of approximately 10 seconds utilizing procedures substantially indistinguishable from those employed in mixing cold alcoholic beverages.

SUMMARY OF THE INVENTION

The basic concept introduced herein is the substantial attainment of thermal equilibrium, at a desired and self-limiting hot service temperature, between a heated alcoholic beverage and its containing cocktail shaker. A critical step in the successful practice of the invention involves agitation of the beverage within the cocktail shaker which is essential for that maximization of surface area contact necessary to reach thermal equilibrium within a minimal time period.

The cocktail shaker is preheated to that temperature at which the temperature of a given quantity of ambient temperature liquid will be raised to a desired serving temperature defined by the attainment of substantial thermal equilibrium with the preheated shaker. The cocktail shaker is removed from the preheat source, the buttered rum mix or other liquid is quickly placed within the shaker and agitated by shaking until substantial thermal equilibrium between the liquid and shaker is attained. The drink may then be poured into a serving receptacle with assurance that its temperature cannot exceed a pre-established upper limit dependent only upon the preheat condition of the shaker having been maintained within narrow limits as by a conventional thermostatically controlled heater. For a given preheat temperature, the maximum possible caloric input to the contained beverage is achieved when thermal equilibrium is reached and is thus a direct function of the thermal capacity of the shaker while the time requirement to reach such thermal equilibrium is an inverse function of the thermal conductivity of the shaker. Thus, desirably, the shaker would have a relatively high thermal capacity so that the required preheat temperature may be maintained relatively low as compared with preheat temperatures which would be required for a shaker having a relatively low thermal capacity to raise the temperature of a given quantity of liquid a given amount. Similarly, good thermal conductivity (i.e., relatively high as compared with that of conventional cocktail shakers not designed to effect rapid heat transfer) is required so that the agitation period may be relatively short.

One empirically determined, specific example involves the use of a 2 ½ pound aluminum shaker having a 12 oz. capacity which is preheated to 195° F. in order to raise the temperature of a 5 oz. buttered rum serving from 75° to 145° F.

Technical considerations of thermal conductivity, thermal capacity and food compatability appear to dictate the use of aluminum or aluminum base alloys as the material from which the shaker would most desirably be fabricated in order to achieve the objectives of the invention while practical considerations of size, weight and cost tend to verify this choice. Thus, aluminum possesses a relatively high thermal capacity (specific heat averaged over the range 0°–100° C. = 0.2114), a relatively high thermal conductivity (0.5 at 18° C. and 0.49 at 100° C.) and a readily available method (anodization) of rendering aluminum inert relative to food.

A plurality of resistance heaters having external configurations generally similar to the shakers are individually, thermostatically controlled by a conventional thermostatic and wiring circuit. Each of the resistance heaters comprise a preheat source for an individual shaker and are conventionally positioned in a desired array upstanding from a preheat console having the various circuits and controls which, additionally, include a pressure sensitive switch in each heater circuit so positioned that removal of a preheated shaker deenergizes its individual preheat source.

Inasmuch as the shakers and heaters are similarly configured the shakers may be inverted over the heaters, to rest on the associated pressure sensitive switch actuators, in such a manner that all parts of a shaker are closely spaced from the associated preheat source which results in minimization of time and power requirements to reach the desired preheat condition; viz, a uniformly heated shaker.

It is obvious that with uniform preheating the total heat energy that must be imparted to the shaker to be available for heat exchange with an ambient temperature liquid to reach a desired serving temperature can be achieved at a lower maximum temperature than would be the case in th absence of uniform preheating such as by concentrating the preheat source adjacent some portion of the shaker. Stated differently, in the case of the aforementioned example, it is only necessary to uniformly preheat the shaker to 195° F. to achieve the desired liquid serving temperature whereas a higher, localized preheat temperature would be required if only a portion of the shaker, such as the bottom, were preheated. The advantage from the standpoint of safety is obvious since the preheated shaker will be maintained in the usual bar work area and accidental touching would normally involve nothing more than a first degree burn. Similarly, when the shakers are to be handled in the manner disclosed herein; not only is the safety factor of importance but, also, less thermal insulation is required for handling. Such thermal insulation may, in its simplest form, involve nothing more than the use of a conventional hot pad holder, although the preferred method of handling the heated shakers is by a removable complimentary shaped styrofoam or other insulative material jacket or conventional standoff insulation such as wire wrapping spaced, at least in part, from the shaker.

Other advantages deriving from the uniform preheating are lower power requirements because of the lesser heat dissipation rate and the ability to position thermostatic sensors at the console surface with assurance that the temperature sensed adjacent the inverted open end of the shaker, which is supported on the console, will be indicative of the overall preheat condition of the shaker.

DESCRIPTION OF THE PREFERRED EMBODIMENT

Figure 1:
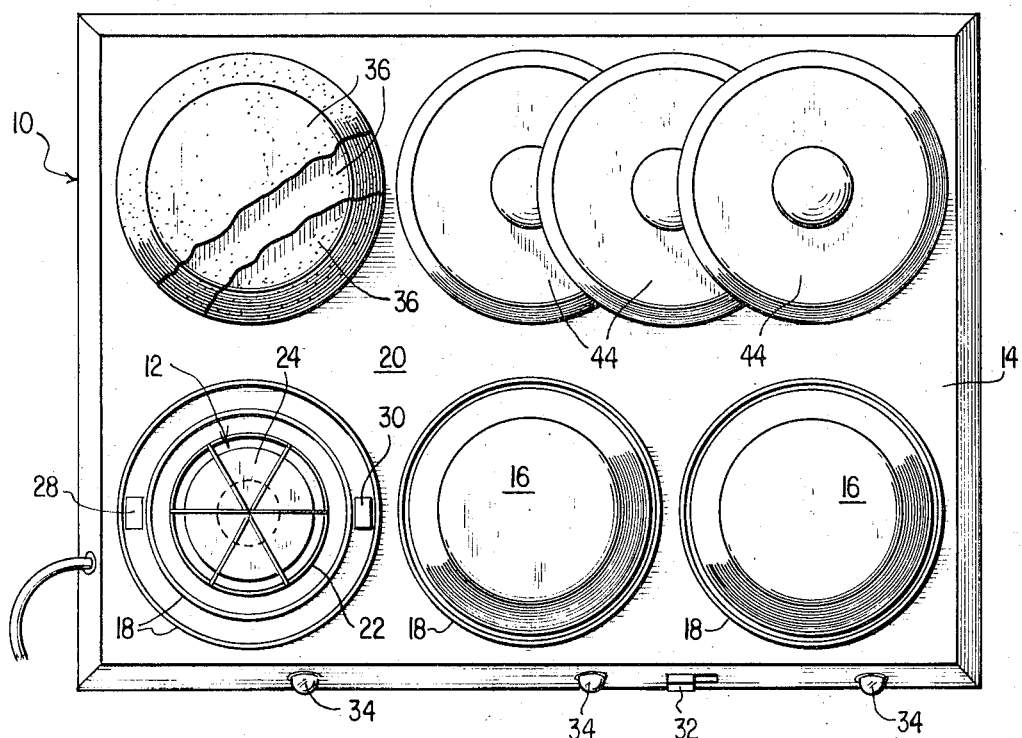
FIG. 1 is a top plan view of preheat console constructed in accordance with the present invention.
Figure 2:
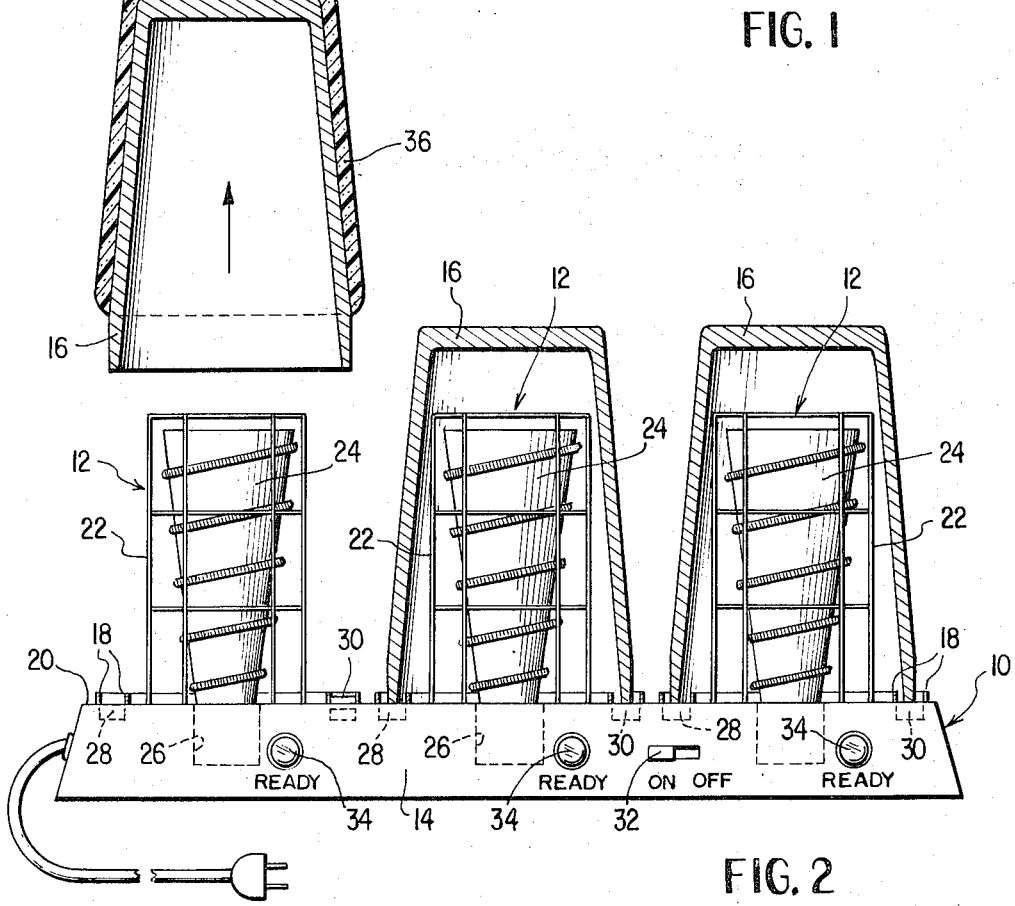
FIG. 2 is a front view of the preheat console with one of the preheated shakers shown in the process of being removed.
Figure 3:
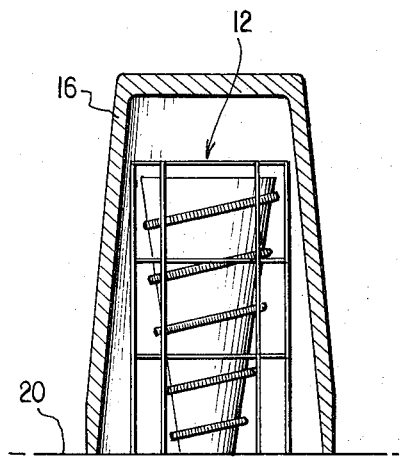
FIGS. 3–6 illustrate sequential steps in the heating of an alcoholic beverage to a proper serving temperature.

In FIGS. 1 and 2 is illustrated a preheat console 10 comprising a plurality of preheating units 12 upstanding from a base 14 and configured generally similar to the relatively thickwalled, aluminum cocktail shakers 16 which are adapted to be inverted thereover and maintained in a generally symmetrical relationship thereto by concentric positioning ring pairs 18 attached to or formed integrally with the upper shaker support surface 20 of base 14. Each preheating unit 12 includes a safety cage 22 surrounding a conventional socket type resistance heater 24 removably received in a screw socket 26 formed in console base 14. A thermostatic sensing element 28 and a normally open, pressure responsive switch 30, positioned intermediate each concentric ring pair 18, control the energization of each heater 24 via conventional circuitry in the usual fashion.

When main power switch 32 is on and a cocktail shaker 16 is inverted to rest on pressure switch 30 to close the same and on thermostatic sensor 28, best illustrated in FIG. 2, the associated resistance heater is energized to preheat the cocktail shaker. Due to the generally similar configuration of the preheating units and cocktail shakers, the shaker is heated substantially uniformly throughout so that the thermostatic sensing taken at the inverted open end of the shaker is indicative of the overall shaker temperature. Upon the attainment of a predetermined temperature, such as 195° F. for a 2 ½ pound, 12 oz. capacity aluminum shaker for example, the heater is thermostatically deenergized and an indicator light 34 is simultaneously energized.

The cocktail shaker may thereafter be removed from its individual preheat source by telescoping a similarly configured styrofoam cup 36 thereover as indicated by the illustrated lifting of the left hand shaker in FIG. 2.

Figure 4:
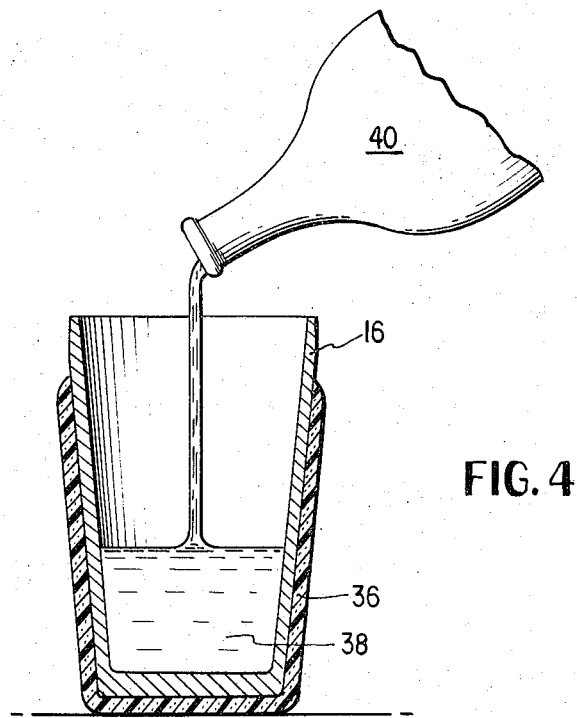
Figure 5:
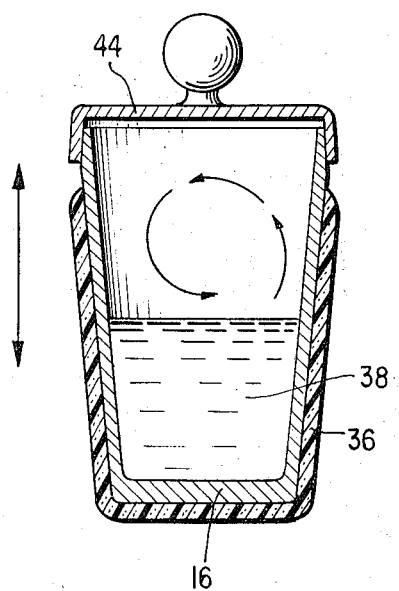
Figure 6:
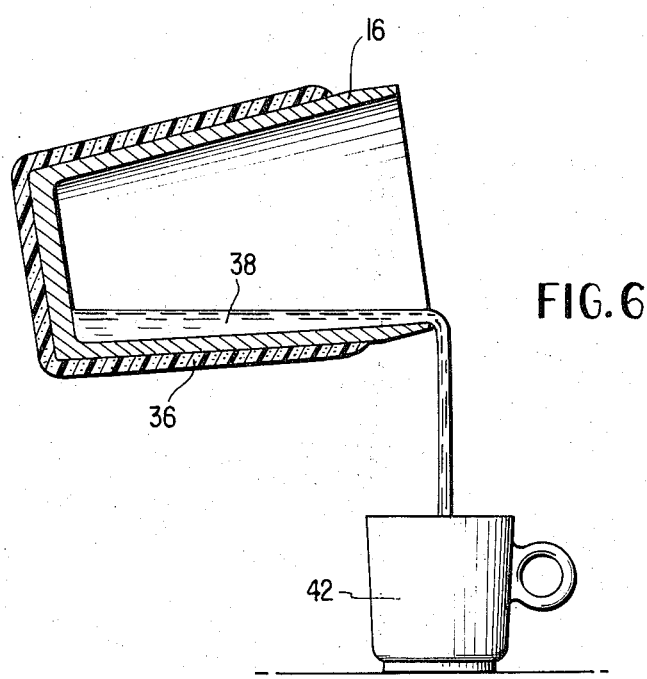

Buttered rum mix 38 at ambient temperature may then be decanted from a stock bottle 40 (FIG. 4), the shaker capped and shaken (FIG. 5) until thermal equilibrium is achieved and the now hot buttered rum poured into a serving mug 42 with assurance that the serving temperature will be well defined within predetermined limits. Thus, with exemplary 5 oz. servings and an ambient temperature of 75° F., the buttered rum mix will reach thermal equilibrium with the aforementioned shaker at approximately 145° F. Inasmuch as the initial preheat condition of the shaker can be accurately controlled and since the only heat source to which the buttered rum mix is exposed is that heat energy stored within the shaker, itself; it is apparent that the shaker provides a self-limiting heat source for the beverage.

Inasmuch as preheating of the shaker cap 44 is not contemplated; the cap is preferably constructed from a thermally insulating material, such as bakelite, which is inert with respect to foods.

Schematic illustrations of the sequential method steps employed appear in FIGS. 3–6 and comprise preheating of the shaker, decanting the ambient temperature drink into the preheated shaker, agitating (by shaking) the drink until thermal equilibrium between the drink and shaker is attained and decanting the heated drink into a serving receptacle.

We claim:

1. A method of modifying fluent material temperature, comprising; positioning a fluent material receptacle in heat exchanging relationship with temperature modifying means; modifying the temperature of said receptacle to substantial contrast with ambient temperature; removing said receptacle from heat exchanging relationship with said temperature modifying means; introducing a fluent material into the temperature modified receptacle in heat exchanging relation therewith; increasing heat exchanging contact surface area between said receptacle and fluent material; and the last named step including agitating said fluent material.

2. A method of heating an alcoholic beverage, comprising; preheating a cocktail shaker to a temperature in excess of a desired beverage service temperature; discontinuing the preheating of said shaker and then decanting an alcoholic beverage into the preheated shaker; increasing surface area exposure between said beverage and shaker; and the last named step including agitating said beverage within said shaker.

3. The method of claim 2 wherein the step of agitating said beverage is continued until said beverage is in substantial thermal equilibrium with said shaker.

4. The method of claim 2 wherein the step of agitating said beverage includes the step of shaking said shaker and the contained beverage.

5. The method of claim 2 wherein the preheating step includes substantially, simultaneously exposing all portions of the shaker to a preheat source to promote preheating of the same; and the discontinuance of said preheating comprises removing said shaker from said preheat source.

* * * * *